(12) United States Patent
Riener et al.

(10) Patent No.: US 8,924,010 B2
(45) Date of Patent: Dec. 30, 2014

(54) METHOD TO CONTROL A ROBOT DEVICE AND ROBOT DEVICE

(75) Inventors: Robert Riener, Wangen (CH); Heike Vallery, Zürich (CH); Alexander Duschau-Wicke, Zürich (CH)

(73) Assignee: Hocoma AG, Volketswil (CH)

( * ) Notice: Subject to any disclaimer, the term of this patent is extended or adjusted under 35 U.S.C. 154(b) by 602 days.

(21) Appl. No.: 13/320,694

(22) PCT Filed: Feb. 11, 2010

(86) PCT No.: PCT/EP2010/000840
§ 371 (c)(1),
(2), (4) Date: Feb. 1, 2012

(87) PCT Pub. No.: WO2010/091857
PCT Pub. Date: Aug. 19, 2010

(65) Prior Publication Data
US 2012/0130538 A1 May 24, 2012

(30) Foreign Application Priority Data
Feb. 13, 2009 (EP) .................................... 09152828

(51) Int. Cl.
*B25J 9/16* (2006.01)
*G05B 19/423* (2006.01)

(52) U.S. Cl.
CPC ..... *B25J 9/1638* (2013.01); *G05B 2219/45112* (2013.01); *G05B 2219/36429* (2013.01); *G05B 2219/45109* (2013.01); *G05B 19/423* (2013.01); *Y10S 901/02* (2013.01)
USPC ............................................. 700/245; 901/2

(58) Field of Classification Search
CPC ............. B25J 9/1638; B25J 1/02–1/08; G05B 19/423; G09B 11/02; A61B 2019/507
USPC ....................................................... 601/5, 33
See application file for complete search history.

(56) References Cited

U.S. PATENT DOCUMENTS 8,147,436 B2 *   4/2012  Agrawal et al. ................. 602/16
2002/0130878 A1 *  9/2002  Perry et al. ..................... 345/581

(Continued)

FOREIGN PATENT DOCUMENTS

WO      02/060653 A2     8/2002

OTHER PUBLICATIONS

Pernalete et al.; "Eye-Hand Coordination Assessment/Therapy Using a Robotic Haptic Device"; Proceedings of the 2005 IEEE 9th International Conference on Rehabilitation Robotics; Jun. 28-Jul. 1, 2005; pp. 25-28; Chicago, IL USA; XP010830381.

(Continued)

*Primary Examiner* — Khoi Tran
*Assistant Examiner* — Ryan Rink
(74) *Attorney, Agent, or Firm* — The Webb Law Firm

(57) ABSTRACT

A method to control a robot device that includes at least one manipulator which is moveable in an operating space, at least one actuator which actuates the manipulator, a sensor arrangement having at least one position sensor to determine the actual position of the manipulator and a controller which controls the actuator. The manipulator moves along an actual trajectory by means of an external force provided by an operator. The actuator provides compensation forces onto the manipulator influencing the torques or forces exchanged between operator and manipulator. The controller includes a conservative force field module having a conservative force field. The controller provides control signals for the actuator which provides the compensation force based on the control signals. The control signals are based on the conservative force field and on the actual position of the manipulator.

16 Claims, 12 Drawing Sheets

(56) References Cited

U.S. PATENT DOCUMENTS

| | | | |
|---|---|---|---|
| 2002/0157617 A1* | 10/2002 | Reinkensmeyer et al. | 119/728 |
| 2007/0282228 A1* | 12/2007 | Einav et al. | 601/33 |
| 2007/0299371 A1* | 12/2007 | Einav et al. | 601/5 |
| 2008/0004550 A1* | 1/2008 | Einav et al. | 601/33 |
| 2008/0161733 A1* | 7/2008 | Einav et al. | 601/34 |
| 2008/0255488 A1* | 10/2008 | Agrawal et al. | 602/23 |
| 2009/0062698 A1* | 3/2009 | Einav et al. | 601/5 |
| 2011/0295165 A1* | 12/2011 | Cavallaro et al. | 601/33 |
| 2013/0158438 A1* | 6/2013 | Scott et al. | 600/595 |

OTHER PUBLICATIONS

Vallery et al.; "Optimized Passive Dynamics Improve Transparency of Haptic Devices"; 2009 IEEE International Conference on Robotics and Automation; Kobe International Conference Center; May 12-17, 2009; pp. 301-306; Kobe, Japan; XP031509853.

Vallery et al; "Generalized Elasticities Improve Patient-Cooperative Control of Rehabilitation Robots"; 2009 IEEE 11th International Conference on Rehabilitation Robotics; Kyoto International Conference Center; Jun. 23-26, 2009; pp. 535-541; Japan; XP031516449.

Pernalete et al.; "Development of a Robotic Haptic Interface to Assist the Performance of Vocagional Tasks by People with Disabilities"; Proceedings of the 2002 IEEE International Conference on Robotics & Automation; May 11-15, 2002, pp. 1269-1274; Washington, DC; XP002529650.

Morasso et al.; "Robot Therapy: The Importance of Haptic Interaction"; Virtual Rehabilitation, IEEE, PI, Sep. 1, 2007; pp. 70-77, XP031151917.

Kuang et al.; "Assembling Virtual Fixtures for Guidance in Training Environments"; Proceedings of the 12th International Symposium on Haptic Interfaces for Virtual Environment and Teleoperator Systems (HAPTICS '04); IEEE, Mar. 27, 2004; pp. 367-374; Chicago, IL; XP010698196.

Turro et al.; "Haptically Augmented Teleoperation"; Proceedings of the 2001 IEEE International Conference on Robotics and Automation; May 21-26, 2001; pp. 386-392; vol. 1; New York, NY; XP010550181.

Mussa-Lvaldi et al.; "Robots Can Teach People How to Move Their Arm"; Proceedings of the 2000 IEEE International Conference on Robotics & Automation; Apr. 24, 2000; pp. 300-305; vol. 1; San Francisco, CA; XP010500234.

* cited by examiner

METHOD TO CONTROL A ROBOT DEVICE AND ROBOT DEVICE

TECHNICAL FIELD

The present invention refers to a method to control a robot device according to claim 1 and a robot device according to claim 6.

PRIOR ART

Robot devices are well known from prior art. Robot devices usually comprise a manipulator such as an arm and a corresponding end-effector which is in connection with the manipulator, an actuator which actuates said manipulator and a controller which provides signals for the actuator.

Robots serving for example as therapy devices for rehabilitation of neurological patients following strokes are well known from prior art. Typically a patient is in connection with the robot via a limb such as legs, an arm or fingers. When the patient moves the robot, the robot dynamics cause forces, which influence the patient moving the robot significantly. These dynamics can be mass and inertia of the robot arm and its drives, as well as friction in the joints, which cause inertial, gravitational, Coriolis, and damping forces. This is one of the drawbacks of such robots.

To address this issue, one possibility is to make the device itself lightweight. In such a case the inertial forces can be reduced significantly. However, the disadvantage of this approach is that such devices cannot exert high forces, such that they are less versatile and can only be used for low-impedance tasks.

For slow motions, gravity compensation has been suggested to cancel gravitational forces of the robot. However, this compensation does not address the issue of high inertial forces, which occur during dynamic motion with nonzero accelerations.

Another possibility is to use force feedback via force sensors, as for example in impedance control or admittance control schemes. Then, friction and inertia of the device can be reduced. However, this reduction is limited, in particular there will be inertial forces remaining. Furthermore, force sensors are needed, which are expensive.

Yet another possibility is to use an actuation concept that at least reduces inertial forces generated by the drives. Such a concept is for example represented by Series Elastic Actuators. However, the compliant actuation does not alleviate inertial forces generated behind the actuators (e.g. due to an end-effector). Furthermore, it requires a compromise concerning achievable maximum stiffness in the device, which might be needed for other tasks to be performed by the robot (such as high-precision stiff position control).

SUMMARY OF THE INVENTION

It is an object of the present invention to provide a method to control a robotic device, in particular an artificial exoskeleton device, which reduces the influence of its own dynamics during dynamic movements. In particular the influences of the robot dynamics onto the limb of a person being coupled to said robotic device shall be limited. A still further object is to achieve the same for robotic manipulators that are manipulated by other operators such as a second robotic effector or manipulator.

Such an object is achieved by the method of claim 1. Accordingly, a method to control a robot device which comprises at least one manipulator which is moveable in an operating space, at least one actuator which actuates said manipulator, a sensor arrangement having at least one position sensor to determine the actual position of the manipulator and a controller which controls said actuator. Said manipulator moves along an actual trajectory by means of an external force provided by an operator. Said actuator provides compensation forces onto the manipulator influencing the torques or forces exchanged between operator and manipulator. The controller comprises a conservative force field module comprising a conservative force field which is defined by a method comprising the steps of defining at least one of said predefined trajectories in the operating space;

creating a force field or calculating needed forces respectively along said predefined trajectories preferably using a dynamic model of the robot device based on positions of the manipulator in the operating space and based on at least one of the velocities of the predefined trajectories and/or of the accelerations of the predefined trajectories; and calculating a conservative force field based on said force field or forces, respectively as a function of the position of the manipulator which conservative force field serves to determine control signals allowing compensation of the robot dynamics and possibly other functionalities as well, such as assistance.

The controller provides said control signals for said actuator which provides said compensation force based on the control signals, wherein the control signals are based on the conservative force field and on the actual position of the manipulator.

Preferably said velocities are functions of velocities of the predefined trajectory in the operating space of the manipulator and/or said accelerations are functions of accelerations of the predefined trajectory in the operating space of the manipulator.

Preferably the conservative force field is further based on a calculation of a needed torques which are needed to move the robot device along said predefined trajectories as a function of the position, the velocities and/or the accelerations of the predefined trajectories preferably by means of using a dynamic model of the robotic device; and wherein an optimisation of the compensation torques is conducted to determine the conservative force field as a function of the position, such that the difference between the compensation torques and the needed torques (plus preferably other torques added to the needed torques, such as assisting torques) is minimised. This compensates the dynamics of the robotic device in an optimal or almost perfect manner in particular when a dynamic model is used. The minimisation is preferably done under the constraint of conservativeness. The compensation torques then provide the best possible approximation of the needed torques while fulfilling the criteria of the conservative force field. These criteria require that the net energy exchanged with the force field for any closed trajectory within the force field is zero or close to zero. This is equivalent to saying that a corresponding potential field exists, such that the force field is the negative gradient of this potential field.

In order to fulfil the constraint of conservativeness, it is easiest to intrinsically describe the force field such that a corresponding potential field exists, for example by setting up the force field as a superposition of passive parameterized elements (such as springs), or by parameterizing a potential field and calculating the force field parameterization as the negative gradient.

Generally the term interaction is to be understood as the interaction between the manipulator and the operator, namely between the robotic device and the operator. It has to be noted that the terms torque and force are used equivalently herein, representing both forces as well as torques.

Such a method has the advantage that the interaction torques or forces between the manipulator or robot and the operator are minimised, at least then, when the actual trajectory is congruent or similar to the predefined trajectory. However, a deviation between the actual trajectory and the predefined trajectory is permissible as it is not the object to force the operator to follow the predefined trajectory. A deviation however, may increase said interaction torques.

Preferably undefined areas in the operating space which have undefined velocities, undefined accelerations and/or undefined needed torques will be filled by means of an extrapolation/interpolation fit under the criteria of the conservative force field.

Preferably overdefined areas in the operating space which have overdefined velocities, overdefined accelerations and/or overdefined needed torques (e.g. originating from multiple trajectories crossing the same point) will preferably be accounted for by means of appropriate weightings during an optimization process, which then leads to a compromise. Alternatively, they will be averaged to remove ambiguity, or they will be omitted by means of an interpolation fit under the criteria of the conservative force field.

Preferably the step of creating the force field uses a dynamic model of the robot.

A Robot device comprises at least one manipulator which is moveable in an operating space, at least one actuator which actuates said manipulator, a sensor arrangement having at least one position sensor to determine the actual position of the manipulator and a controller which controls said actuator. Said manipulator is moveable along an actual trajectory by means of an external force provided by an operator. Said actuator provides compensation forces onto the manipulator influencing the torques or forces exchanged between operator and manipulator. The controller comprises a conservative force field module comprising a conservative force field which is defined by a method comprising the steps of defining at least one of said predefined trajectories in the operating space;

creating a force field or calculating needed forces, respectively along said predefined trajectories preferably using a dynamic model of the robot device based on positions of the manipulator in the operating space and based on at least one of the velocities of the predefined trajectories and/or of the accelerations of the predefined trajectories; and calculating a conservative force field based on said force field or forces, respectively as a function of the position of the manipulator which conservative force field serves to determine control signals allowing compensation of robot dynamics and possibly other functionalities as well, such as assistance.

The controller provides said control signals for said actuator which provides said compensation force based on the control signals, wherein the control signals are based on the conservative force field and on the actual position of the manipulator.

Further embodiments of the present invention are outlined in the dependent claims.

BRIEF DESCRIPTION OF THE DRAWINGS

The drawings will be explained in greater detail by means of a description of an exemplary embodiment, with reference to the following figures.

DETAILED DESCRIPTION OF THE PREFERRED EMBODIMENTS

Figure 1:
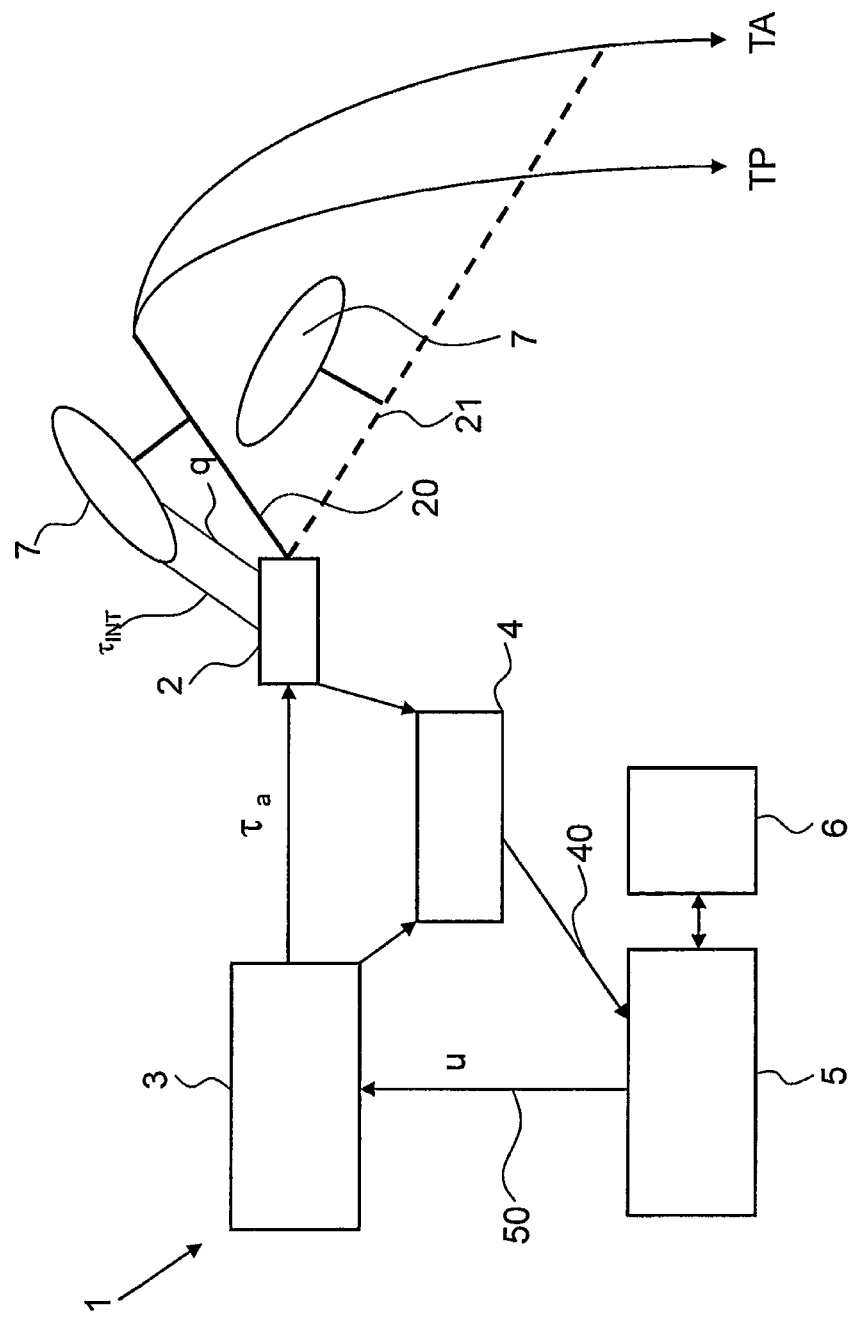
FIG. 1 shows a schematic diagram of features of a robot device and the interaction between the features of the device.

FIG. 1 shows in a schematic view a robot device 1 comprising at least one manipulator 2, at least one actuator 3 which actuates said manipulator 2, a sensor arrangement 4 having at least one position sensor to determine the actual position of the manipulator 2 and a controller 5 which controls said actuator 2.

The manipulator 2 is moveable along an actual trajectory TA by means of an external force that is provided by an operator 7 which is symbolized by the elliptic object. The manipulator is symbolized by line 20, and it is moved with its end point along the actual trajectory TA. Broken line 21 shows manipulator 2 at a second position. The operator can be a further robot, a moving object such as car on an assembly line, or an organism or mammal such as a human or an animal. It is the main aim of the device according to the invention that the robot is maximally transparent (meaning that forces exchanged between robot and operator are as close as possible to a desired interaction force, e.g. zero when no interaction is desired, and this special case is considered in the following), at least when the actual trajectory TA is equal or congruent to a predefined trajectory TP. However, the manipulator 2 is provided such that a deviation or divergence between the actual trajectory TA and the predefined trajectory TP is possible, if the operator 7 is not able or willing to follow the predefined trajectory TP. It is not the aim of the present invention to force the operator to follow the predefined trajectory TP, but it is the aim to minimize interaction torques between the manipulator and the operator. Preferably said interaction torques are minimised when the actual trajectory is close to the predefined trajectory TP. The method as described herein provides a help for the operator in following the predefined trajectory TP which means in performing a predefined movement. When the operator leaves the predefined trajectory TP, higher interaction torques may be experienced by the operator, which can signal to the operator that the predefined trajectory TP and therefore the intended path has been left. However, a forced return of the operator onto the predefined trajectory TP is not mandatory or preferred within the present invention, although the interaction torques may favor the return.

The predefined or given trajectory TP is dependent and therefore based on external influences such as a motion pattern of the operator 7. Thereby the predefined trajectory TP can be a single trajectory or a plurality of trajectories within the operating space. However, it is preferably a set of positions with corresponding velocity and acceleration. For each position/velocity/acceleration data point, the torques needed to move the robot in this particular instant are calculated from a given model of the robot. Based on these points and the corresponding needed torques, the force field is designed. This force field attempts to assign the calculated needed force to the position, such that each time the position is reached, the fitted force will be generated, regardless of the actual velocity and acceleration and thus the actually needed forces. The force field may not be perfectly able to achieve this perfect assignment due to two reasons: Firstly, during design of the force field, the constraint of conservativeness is assured. Secondly, the more predefined trajectories are provided in the operating space, the less good the compensation may become along one single trajectory, because the various trajectories with potentially very different velocities/accelerations for the same positions "compete" for the optimal force field for them. In case the operator is a human, the predefined trajectory TP is dependent on natural motion pattern of parts of the body, such as an arm or a leg, that are in contact with the manipulator. In other words: The predefined trajectory TP can be a typical gait trajectory over one step of a human, or it can be a typical reaching movement with one arm. The predefined trajectory TP is preferably defined before the motion by the manipulator begins. It has to be noted that the manipulator may be located on a point which is not on the predefined trajectory TP when the motion is started.

In case the operator is a further robot, the predefined trajectory TP is dependent on the operating space of the robot and/or on the planned motion.

In other embodiments however, the predefined trajectory can also be designed during a course of motion. In this case, the course of the actual trajectory influences the predefined trajectory. Thereby the predefined motion pattern and thus the force field of the manipulator 2 can be adjusted. Preferably, this adjustment is done only very slowly, because a quickly changing force field may lead to instability, and/or the energy flow to the system due to the variation of the potential field is supervised. Preferably the predefined trajectory TP can also consist of various single trajectories, and it can comprise bifurcations, wherein the operator chooses along which path to follow. The single trajectories can be disconnected from each other, or they can intersect.

Generally it is anticipated as mentioned above that the actual trajectory of the operator will be equal to the predefined trajectory meaning that the equality of the actual trajectory and the predefined trajectory is the preferred motion of the operator. Generally, undesired interaction forces or interaction torques between the robot and the operator occur during this motion, due to the dynamics of the robot (damping, Coriolis forces, gravity, and, in particular, inertia). With the control scheme of the invention, said undesired interaction forces or torques shall be minimized. Once the deviation between the actual trajectory TA and the predefined trajectory TP increases, the interaction forces or torques between the operator and the manipulator change as well. The change of the interaction forces or torques is usually considered as an increase of the forces, but there can also be cases where undesired interaction forces are even lower on another trajectory than the predefined one. It is more likely, however, that the interaction forces increase slightly, because the compensation is not guaranteed to be optimal anymore. In order to minimize said interaction force, a conservative force field module 6 comprising a conservative force field is arranged within the controller 5 as it is explained further below. The major function of the conservative force field module is to allow the calculation of a compensation force that shall act onto the manipulator based on the actual position which is a point on the actual trajectory TA. In other words: said conservative force field module provides data concerning the compensation force. This compensation force aims to compensate the dynamics of the robot. When the deviation between the actual trajectory TA and the predefined trajectory TP increases, the compensation defined by the force field may not be optimal anymore, meaning that interaction forces may increase, which is undesired. In order to counteract this, a large number of possible trajectories TP can be used to calculate the optimal force field. However, this will mostly lead to a compromise in terms of good compensation of dynamics along one single trajectory versus a high number of possible motions with low interaction.

The manipulator 2 can be provided in a huge variety of embodiments. It is for example possible that the manipulator is designed as a single arm that is in connection with a stationary joint around which the arm is moveable. Furthermore it is possible that the manipulator 2 has two arms which are connected by means of a joint, wherein one arm is connected to a stationary joint. It is also possible that there is no stationary joint, for example when the robot is a wearable actuated orthosis. Thereby it is irrelevant at which position(s) the external (interaction) force acts onto the manipulator 2.

Depending on the physical design of the manipulator 2, it is moveable along a 1-dimensional axis, within a 2-dimensional plane, or in a 3-dimensional space. The manipulator can be fixed to a stationary point. The range of operation of the manipulator is designated as the operating space of the manipulator. Therefore the manipulator 2 is moveable within this operating space.

The manipulator 2 is in connection with at least one actuator 3 with which said compensation force onto the manipulator 2 is applicable. The actuator 3 is designed such that it can generate compensation forces that are preferably at least as large as the forces that are caused by the dynamics of the manipulator 2 when moved along the predefined trajectory, which is equivalent to saying that these forces must be large enough that they could move the manipulator along the predefined trajectory by themselves. If this is not the case, compensation will only be suboptimal, but it can still be done to alleviate the operator from part of the interaction forces. Such limitations are preferably considered as inequality constraints during optimization of conservative force field. This means that the actuator provides compensation forces onto the manipulator influencing the forces exchanged by the robot and the operator when the operator intends to move the robot, possibly reducing the forces to zero. In view of a gait robot which is in connection with a leg of a person this means that the actuator provides a compensation force supporting the movement of the manipulator when the person is exercising. However, the actuator does preferably not provide forces such that the manipulator is moveable without the forces provided by the operator such as by the user with the leg.

As it is mentioned herein and as it is clear from the drawings the manipulator 2 is in connection with an operator 7 which may be a human or an additional robotic device. For providing the connection, the manipulator comprises at least one connection point to which an additional robotic device, which fulfils the function of the operator, or the human is connectable.

In other embodiments however, the actuator 3 can be designed such that it provides higher compensation forces onto the manipulator to move it without the force of the operator.

The sensor arrangement has at least one position sensor 4 that is arranged to detect the position of the manipulator 2 during the motion. Thereby the position sensor 4 provides a set of data that comprises information concerning the actual position of the manipulator within the operating space. The set of data comprises for example coordinates of the actual position of the manipulator in the operating space. The coordinates can be absolute coordinates based on a point of origin in the operating space or relative coordinates which are relative to a previously determined position. Such a set of data can be provided for predefined increments of the motion or regular time intervals. The sensor 4 can be attached to the manipulator 2 and/or it can preferably be an integral part of the actuator 3.

The set of data is submitted via a transmissions mean 40 to the controller 5 which comprises a respective interface, memory means and a processor to receive, store and process said data.

Optionally the sensor arrangement can also comprise a force sensor measuring an interaction force between the manipulator 2 and the operator 7, whereby the force sensor provides a respective force signal for the controller 5. Said force signal can be used to reduce the inertia of the manipulator beforehand. The conservative force field however, can be provided without the arrangement of the force sensor.

The controller 5 comprises a conservative force field module 6 comprising a conservative force field that is designed based on the predefined trajectory TP. The controller provides control signals u for said actuator 3 based on the actual position of the manipulator 2 and on the information provided by the conservative force field. This means that when the manipulator 2 is moved to a specific location, the position sensor 4 of the sensor arrangement will send the position information of the manipulator to the controller 5 which provides said information to the conservative force field module 6. Based on the position of the manipulator 2, the conservative force field module then provides data relating to said compensation force based on the actual position of the manipulator to the actuator for the controller 5. The control signals being based on said data are then submitted by a communication means 50 to the actuator. The actuator 3 then provides a compensation force based on said control signals onto the manipulator 2, to reduce interaction forces/torques occurring between said operator 7 and said manipulator 2 to a minimum. The interaction forces/torques are preferably minimised (or as close as possible to a certain desired value) when the actual trajectory TA is equal to the predefined trajectory TP.

The conservative force field is a function of position, which can be defined by arithmetic expressions or by a set of data that forms a lookup-table. The function describes force vectors which are allocated to predefined positions (e.g. to points within the operating space of the manipulator), where the force field is calculated by an optimization based on the predefined trajectory TP. Such a force field is shown in FIG. 4c where the force vectors are illustrated as arrows. Each force vector represents the compensation force for the respective position. The force vector V1 extends from a defined position P1 in the direction as defined in the conservative force field. The length of an arrow represents the magnitude of the compensation force that shall be applied onto the manipulator 2 when the manipulator is moved to that position (with the actual trajectory TA).

Although it is shown in the embodiment of FIG. 4c that the actual trajectory TA deviates from the predefined trajectory TP over certain sections and becomes congruent with the predefined trajectory TP over other sections, it has to be noted again that it is not the aim of the present invention to provide compensation forces which force the operator back to the predefined trajectory TP, once the actual trajectory TA deviates from the predefined trajectory TP. The interaction torques or interaction forces between the operator and the manipulator are minimised at least then, when the actual trajectory TA is congruent or similar to the predefined trajectory TP.

The operation space is represented by a plurality of location points in the conservative force field. To each of the representation points, a force vector is assigned. The force vectors are defined on the basis of the predefined trajectory and on the criteria that the interaction torques between the operator and manipulator of the robot shall be minimised. The plurality of force vectors defines the conservative force field. Thereby, the compensation force is determined such that the interaction torques between operator and robot will be limited or minimised. The generation of a conservative force field will be explained below. Generally it can be mentioned here that criteria regarding the conservativeness requires that the net energy exchanged with the force field for any closed trajectory within the force field is zero (or almost zero, due to inaccuracies of the numerical calculation, as well as quantization during haptic rendering).

Furthermore, one can also say that the actual position on the actual trajectory TA of the manipulator within the operating space has a representation point P1 within the conservative force field. As mentioned, to each point in the conservative force field a respective force has been allocated. Thereby, the signal provided by the controller or the conservative force field module, respectively, is provided based on the representation point of said actual position within the conservative force field and the compensation force that is allocated to said representation point.

Compensation forces are also provided when the actual trajectory TA is equal to the predefined trajectory TP. Said forces may have a direction that is different from the direction of the predefined trajectory TP. In other words: When said forces are provided, it is possible to enable the manipulator 2 to be moved along the actual trajectory TA with minimised intervention of the operator as for example said forces act against the inertia of the manipulator 2 itself.

The compensation forces in the conservative force field are a function of the current absolute or relative position, respectively. The forces can be determined as a result of an optimization. For that purpose, forces which would be necessary to move a manipulator along the predefined trajectory TP with a minimised effort for the operator will be determined based on a model of the robot and its manipulator. Based on that model, a conservative force field is generated, which comprises said forces being considered as compensation forces. Hence a force vector is searched as a function of the position vector over a defined definition range of the position vector.

The generation of said force field would lead to the optimal case in which the force field would provide signals based on the position of the manipulator which allow to move the robot along the predefined trajectory TP with a minimized effort for the operator. However, the strategy remains passive, meaning that one is theoretically able to find an equivalent mechanical structure being made out of elastic elements such as springs, causing the same behavior.

The generation of the conservative force field is shown and explained in conjunction with the embodiments in FIG. 7a to FIG. 7d. For this example, the operating space is a two-dimensional operating space having dimension $q_1$ and $q_2$. In other embodiments, the operating space can also be multidimensional. In order to determine the force field, one or more of the predefined trajectory TP are known and a model of the robot dynamics should be known, at least approximately. With regard to the predefined trajectory TP is has to be mentioned that it is also possible that only fragments or points of the predefined trajectory are known, which means that the predefined trajectory comprises several undefined sections. Said sections can be designated as undefined areas UA. Furthermore it is also possible that for some sections or positions various instances are present which leads to overdefined points OP, e.g. overlapping of several predefined trajectories TP.

The method to determine or define a conservative force field comprises the following steps:
 defining at least one of said predefined trajectories (TP) in the operating space;
 creating a force field or calculating forces, respectively preferably along said predefined trajectories preferably using a dynamic model of the robot device based on positions (q) of the manipulator in the operating space preferably on said predefined trajectories (TP) and based on at least one of the velocities ($\dot{q}$) of the predefined trajectories (TP) and/or of the accelerations ($\ddot{q}$) of the predefined trajectories (TP), optionally by use of a dynamic model of the robot; and
 calculating a conservative force field (10) or forces respectively based on said forces as a function of the position of the manipulator (2) which conservative force field serves to determine control signals allowing compensation of the robot dynamics and possibly other functions as well such as assistance.

Figure 7A:
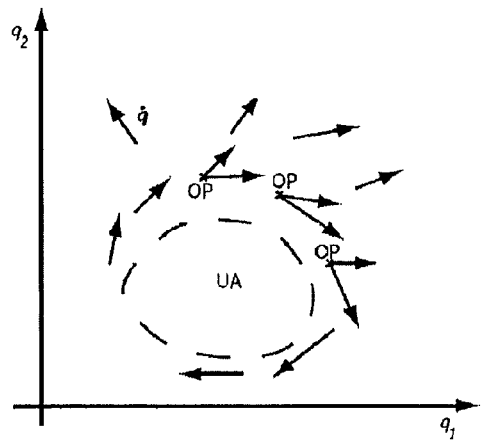
FIGS. 7a-7d illustrate the procedure to provide a force field to be used by the conservative force field module.

FIG. 7a shows velocities plotted over position. Thereby each arrow $\dot{q}$ shows the respective velocity for the predefined trajectory at the specific location along the predefined trajectory TP of a given point.

Figure 7B:
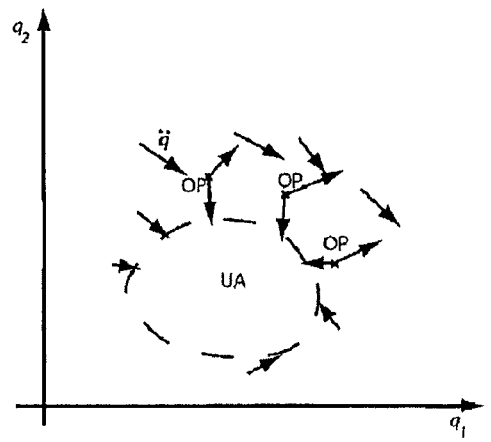

FIG. 7b shows accelerations plotted over position. Each arrow $\ddot{q}$ shows the respective acceleration for the predefined trajectory to a given point.

Figure 7C:
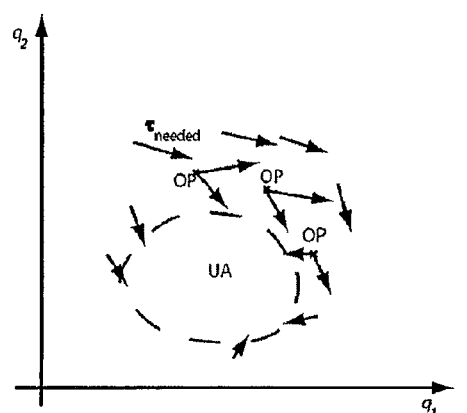

FIG. 7c shows the robot model which provides $\tau_{needed}$ as a function of the acceleration velocity $\dot{q}$ and position q, thereby the needed torques or forces are also plotted over position. FIG. 7c shows therefore the step of calculating forces based on at least one of the velocities and/or of the accelerations ($\ddot{q}$) of the predefined trajectories (TP) and associating them to positions.

Figure 7D:
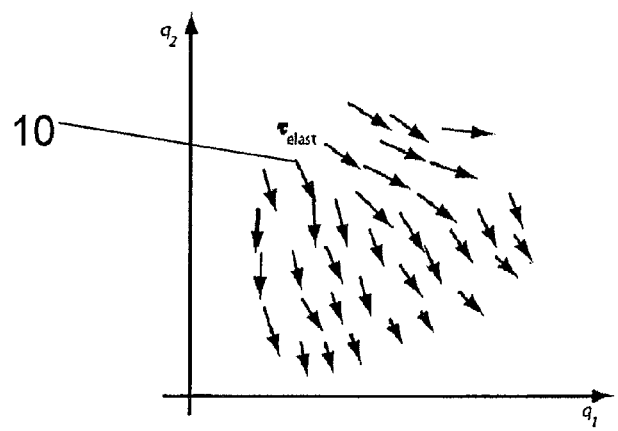

FIG. 7d shows the conservative force field 10 plotted over position. Based on the data of $\tau_{needed}$ an optimisation with the aim to find a conservative force field $\tau_{elast}$ as a function of the position q such that a certain error between $\tau_{needed}$ and $\tau_{elast}$ is minimal. For example the error can be an absolute or a quadratic weighted error:

$$J = \|\tau_{elast} - \tau_{needed}\|_Q^2 \quad (1)$$

Additional terms in the error function J and additional constraints are possible, for example to limit forces, or to enforce non-zero desired interaction forces (e.g. to assist the human).

As a result, a map of elastic torques/forces as a function of position is given, and no overdefined points remain as shown in FIG. 7d. Thereby overdefined points OP in the predefined trajectory and the constraint of conservativeness may require a compromise during the fit (An average force will automatically be found when including these overdefined points in the optimisation. Alternatively, these points could be omitted, making the area undefined). Undefined areas UA can be filled (similar to an interpolation or an extrapolation).

Figure 2:
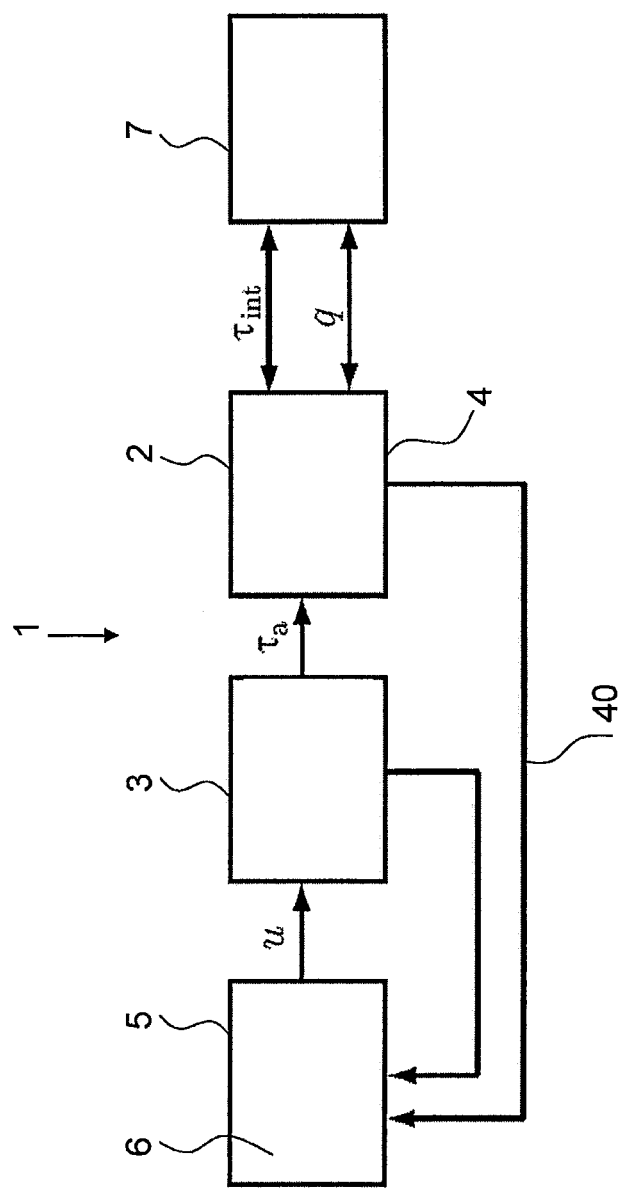
FIG. 2 shows a further schematic diagram of features of a robotic device and the interaction between the features of the device.

FIG. 2 shows a further schematic illustration of a device according to the present invention. The same elements are designated with the same reference numerals as in the previous figures. The robot 2 having at least one manipulator is in connection with the actuator 3 that generates forces/torques $\tau(u)$ based on the signals as received from the control unit 5 which comprises the conservative force field module 6, and it applies forces/torques $\tau_a$ onto the manipulator. The actuators will in general also contribute a considerable inertia (for example for stiff actuators like DC motors, due to the rotating motor coil), and the forces/torques $\tau_a$ transmitted from actuators to robot need therefore not be equal to the forces/torques $\tau(u)$ generated by the actuators. The operator 7 moves the manipulator 2, this motion is described by the position vector q as a function of time. This manipulation shall be possible with minimum efforts which relates to maximally transparent behavior of the robot and good transparency. The compensation force vector $\tau(u) = \tau_{elast}$ compensates robot dynamics while the user moves the robot, in order to limit the interaction torque vector $\tau_{int}$. The output u of the controller 5 which is a set of data can be adjusted appropriately in order to fulfil the criteria as just mentioned. The control strategy can use sensor information from actuators and/or the robot. Said sensor is preferably a position sensor. The compensation probably works best when the actual trajectory TA is close to the predefined trajectory TP. With increasing deviation of the manipulator from the actual trajectory TA to the predefined trajectory TP, it is possible that the interaction torque $\tau_{int}$ may increase (although this is not desired), because the force field is optimized for the given predefined trajectory (or set of trajectories) TP.

The compensation torques or forces ($\tau_{elast}$) then provide the best possible approximation of the needed (interaction) torques ($\tau_{needed}$) while fulfilling the criteria of the conservative force field. These criteria require that the net energy exchanged with the force field for any closed trajectory within the force field is zero (or at least close to zero within the accuracy of calculation).

In other embodiments it can be also possible that further sensors are used in order to determine more parameters. For example the motor currents can be detected in order to implement security measures. Furthermore it can be possible to use encoders which are in connection with the actuators or to use potentiometers within the joints in order to detect more position information or to measure position redundantly.

The conservative force field module 6 can de designed in different forms, but it is preferably a static function of the positions. Preferably the conservative force field is encoded in an arithmetic function or in a look-up table comprising data concerning the compensation forces assigned to a position and their respective magnitude and direction of action.

The conservative force field module provides forces that are defined as a static function of position. The conservative force field module will lead to the robot exhibiting a passive behavior that does not resemble the motion of the uncontrolled robot, and it will show a definite preference for certain types of dynamic motion, e.g. it may have a specific "eigenmotion" that resembles the task to be performed by the operator in interaction with the device. The force field is not optimized to lead or guide the robot back to the predefined trajectory TP in case it has been left.

In the following paragraphs, the design or generation of a conservative force field to minimize interactions torques will be outlined.

In general, both robot (e.g. moveable manipulator) and actuator have a certain inertia, which can be subsumed in a common mass matrix $M_r$. Furthermore, there are gravitational, damping, and Coriolis forces (subsumed in $n_r(q, \dot{q})$) depending on the kinematics of the system. Assuming that the motion of the system can be described by the generalized coordinates q, the equations of motion including actuator and robot dynamics are:

$$\tau_{needed}(q,\dot{q},\ddot{q})=M_r\ddot{e}+n_r(q,\dot{q}). \qquad (2)$$

The required torques $\tau_{needed}$ to move the robot can be generated both by the robot's actuators, as well as by the human. Forces from the human acting on the controlled robot are subsumed in the interaction torque vector $\tau_{int}$ and forces of the robot actuators are subsumed in $\tau(u)$:

$$\tau_{needed}=\tau_{int}+\tau(u). \qquad (3)$$

The question is now how to find the optimal vector of control signals u for the robot's actuators such that they take over the main part, and that the forces that need to be generated by the operator are minimal.

When the manipulator is provided such that it is light weighted, the terms $M_r\ddot{q}$ and $n_r(q, \dot{q})$ are small. This may be one possibility to reduce interaction torques. However, this leads also to problems in terms of the mechanical stability of said manipulators, as well as deficient power for other tasks than just Zero-Impedance (Zero-Impedance will in general not be the only goal of a robotic manipulator, it is only the basis for superimposed control strategies), which is an undesired side effect.

In case the robot disposes of force sensors, we assume that closed-loop force control is applied, reducing the mass matrix $M_r$ to the minimum achievable value (using concepts like admittance or impedance control), and possibly $n_r(q, \dot{q})$ is also modified via control (e.g. to compensate friction).

The equations of motion (2) are then changed to:

$$\tau_{needed}(q,\dot{q},\ddot{q})=M_{r,red}\ddot{q}+n_{r,red}(q,\dot{q}), \qquad (4)$$

This representation includes the special case where no closed-loop force control is applied, such that $M_{r,red}=M_r$ and also $n_{r,red}=n_r$.

A complementary or alternative solution will be presented here by performing an optimization to minimize interaction torques, which is the aim of the invention as described herein. One advantage is that no model of the user is necessary, the only input needed for the optimization is a model of the robot and the desired movement trajectory, which is also designated as the predefined trajectory TP to be performed with minimum interaction forces. Thereby, the robot or manipulator imitates the behavior of passive components, thus, no net energy is provided to the user, who still has to initiate and control any motion. In other words: The integral of positive and negative energy exchanged between robot and human along a closed path will be zero. The robot will behave as though it only stores and releases energy provided by the user, it does not provide energy to the user. This concept of passivity is an important concept in the analysis of stability, because two passive systems coupled together will be stable. A stable system can be described by a mechanical equivalent consisting only of masses, springs, and dampers (no energy source).

The idea is to formulate suitable conservative force fields to be emulated by the robot or manipulator that reduce necessary effort by an external operator that wants to guide the robot along certain desired motions. This structure is chosen to make the controlled system intrinsically passive, which ensures stability of the coupled system environment-robot. As the whole concept is based on feedforward elements, preferably no force sensors are needed for its realization (Although these sensors could help to still improve behavior further, as has been shown in the literature. These concepts can be seen as complementary.) However, it is necessary to arrange position sensors.

In order for $\tau(u)$ to describe a conservative force field, its work must be zero for any closed trajectory. Alternatively, it means that the forces in the vector $\tau(u)$ can be interpreted as "elastic" functions of the joint variables q, and as the gradient of a potential field $\phi(q)$:

$$\tau(u)=\tau_{elast}(q)=-\nabla_q\phi(q). \qquad (5)$$

Apart from this constraint that the field must be conservative, this representation is very open, such that is can e.g. represent elastic belts or gravitational components.

The optimisation procedure now shapes $\phi$ and thus $\tau_{elast}$ as functions of q in such a way that interaction torques needed to move the robot along a given set of trajectories, which are described by q and its derivatives $\dot{q}$, $\ddot{q}$, are minimal. Using (3) and (5), the necessary interaction torques left to move the robot by the operator are given by $$\tau_{int}=\tau_{needed}(q,\dot{q},\ddot{q})-\tau_{elast}(q). \qquad (6)$$

The actual interaction torques depend on position, velocity, and acceleration. Based on previous knowledge encoded in the predefined trajectory TP, velocities and accelerations are associated to position, which implies that with a robot model, needed torques to move the robot can also be associated to position. Then, a position-dependent force field is fitted that approximates the needed forces/torques as good as possible for the predefined motions. If a set of trajectories q, $\dot{q}$, $\ddot{q}$ is given with n samples for m joints with $\tau_{int,k}$ being the interaction torque vector at sample k, the goal is to minimize the quadratic cost function J with $$J = \left\| \begin{pmatrix} \tau_{int,1} \\ \ldots \\ \tau_{int,k} \\ \ldots \\ \tau_{int,n} \end{pmatrix} \right\|_Q^2 = \left\| \begin{pmatrix} \tau_{needed,1} \\ \ldots \\ \tau_{needed,k} \\ \ldots \\ \tau_{needed,n} \end{pmatrix} - \begin{pmatrix} \tau_{elast,1} \\ \ldots \\ \tau_{elast,k} \\ \ldots \\ \tau_{elast,n} \end{pmatrix} \right\|_Q^2, \qquad (7)$$

whereby the symmetric positive definite matrix Q contains weights that stress the importance of certain joints and certain instances k of the movement.

For trivial problems, the optimal passive dynamics can be deduced directly, as will be shown in Example 1. In case the problem is not trivial, a suitable parameterization of a conservative force field $\tau_{elast}$ in (5) can be set up. Such a parameterization of the force field can be done either in terms of the potential, or directly in terms of the force field. In the first place, an arbitrary smooth function can be used. In the second case, the constraint of conservativeness must be considered, such that a possible strategy would be to build the force field by superposing several passive elements, such as (nonlinear) elastic elements or a gravitational field. There is an almost infinite number of possible parameterizations, especially depending on the dimensionality of the problem. For problems of very low complexity, even a grid would be a possible parameterization. A very frequent parameterization are polynomials or so-called Radial Basis Functions (see e.g. A. Iske, Muliresolution Methods in Scattered Data Modeling, Lecture Notes in Computational Science and Engineering. Springer-Verlag, Heidelberg).

The method proposed here is independent of a specific parameterization, therefore, three examples will be shown, one without parameterization, and two that use different parameterizations.

EXAMPLE 1

Point Mass with One Degree of Freedom

FIGS. 3a to 3e show an example of a model to determine said conservative force field, whereby gravity will not be considered.

Figure 3A:
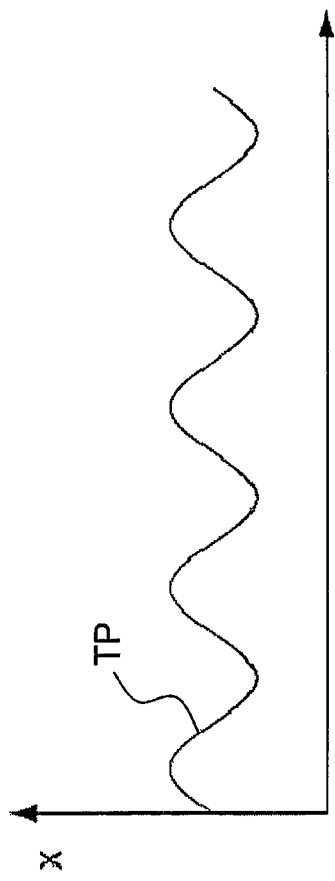
FIGS. 3a to 3e show an example of a model to determine a conservative force field.
Figure 3B:
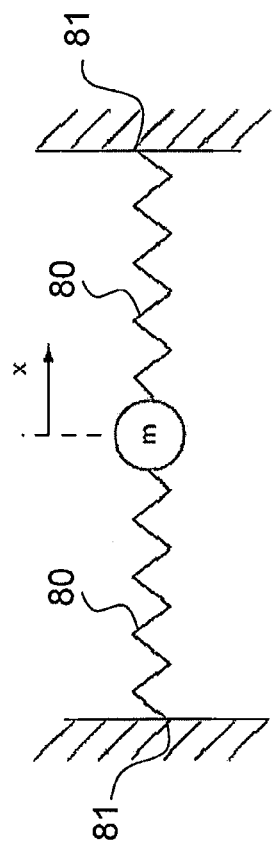
Figure 3C:
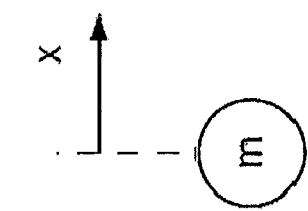

FIG. 3a shows a point mass m with one degree of freedom which is to be considered as manipulator that shall be moved in direction x back and forth along a predefined trajectory TP as shown in FIG. 3b. The predefined trajectory is a sinusoidal trajectory, such that acceleration is also sinusoidal and linearly depends on position. Without helping force fields, the operator would have to accelerate and decelerate the mass m to enforce every single oscillation, such that he would generate and dissipate kinetic energy continuously. If that kinetic energy could be stored and released in the robot, the oscillating behavior could maintain itself once started. This is the goal of the generalized elasticity. The task is to design a conservative force field that facilitates this motion and reduces necessary interaction torques to a minimum.

For this very simple example, the design of the conservative force field can be achieved as follows: It is well-known that a sinusoidal trajectory is the natural oscillation of a mass-spring system having two springs 80 being fixed to a fixed point 81 as shown in FIG. 2c. This system shows optimal passive dynamics of the robot to realize the desired sinusoidal trajectory without any interaction torques. Therefore, the force field can be designed directly by inserting a spring with appropriate stiffness c, such that the eigenfrequency ($\sqrt{c/m}$) of the system matches the frequency of the operator movement.

On this example, the formal procedure of the force field design will be followed for illustration: First, the needed forces need to be determined to move along the predefined trajectory TP. For this example, the needed forces are given by the product of mass m and acceleration. As acceleration can be described as a linear function of position in the sinusoidal movement, also the needed forces can be described by a linear function of position. The conservative element to generate a compensatory elastic force that linearly depends on position is a linear spring, and the spring constant can be found by dividing needed torques by the corresponding position.

Figures 3D, 3E:
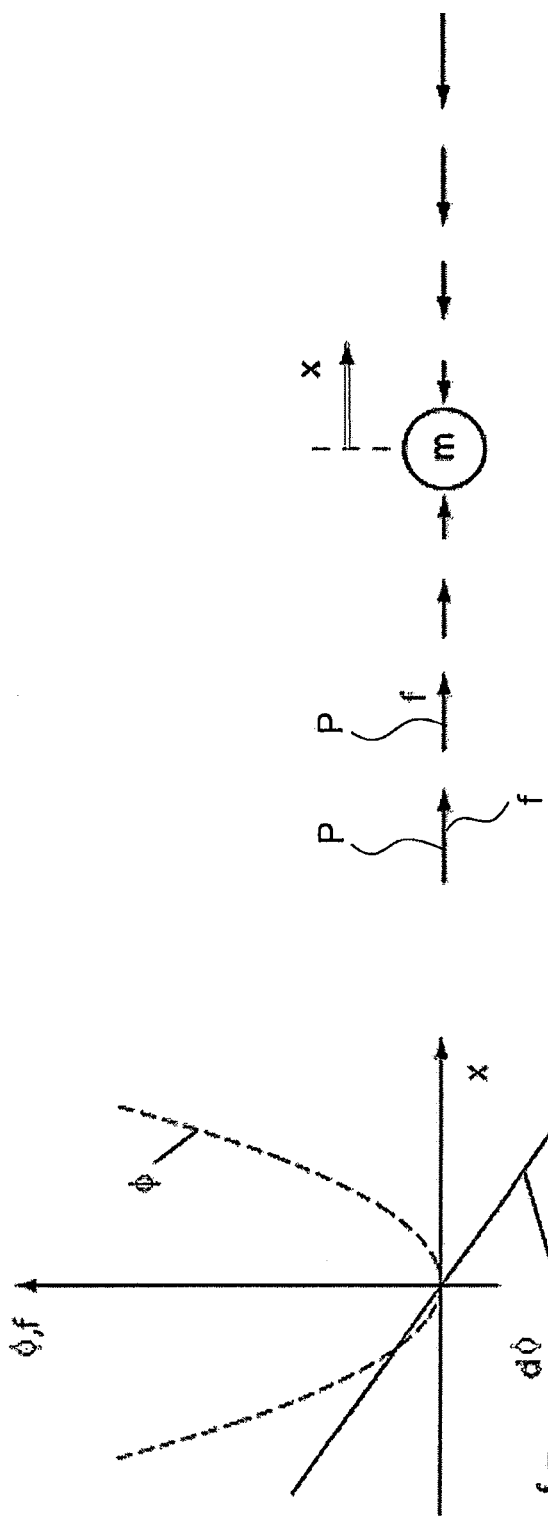

This virtual passive component is shown in FIG. 3d. The potential $\phi(x)$ and the scalar force field $\tau_{elast}=f(x)$ representing this virtual component are also very simple, the force increases linearly with distance from the mean value of x, as shown in FIG. 3e. As soon as the natural oscillation has been initiated (which can be done by choosing a good starting condition or letting the robot supply an initial impulse), the external operator interacting with this robot will now need no effort to move it along the predefined trajectory TP, operator and robot with manipulator will move in parallel and exchange no forces. Still, the operator is in full command of the robot, which does not execute a simple position trajectory and reacts compliantly.

FIG. 3e shows the conservative force field having a number of forces f which are allocated to certain points P. Thereby the increasing length of the arrows as shown in FIG. 2e symbolize that the force is increasing with increasing displacement from the zero position.

EXAMPLE 2

Parameterization of a Potential

Figure 4B:
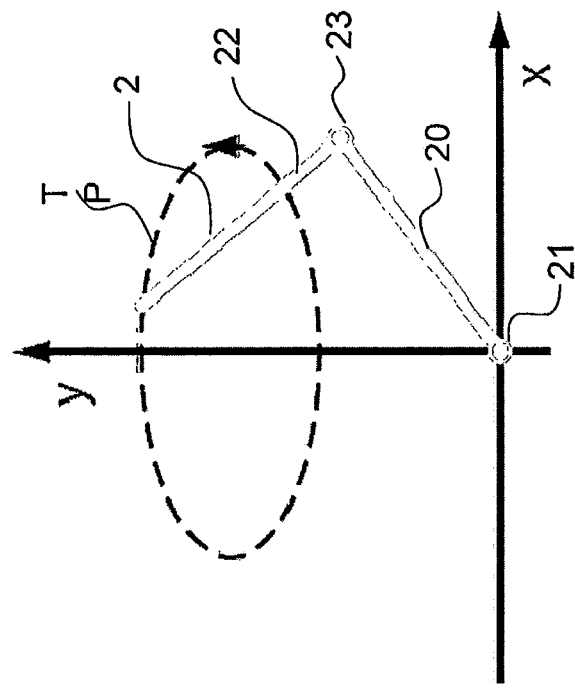
FIGS. 4a and 4b show a manipulator having two segments.
Figure 4A:
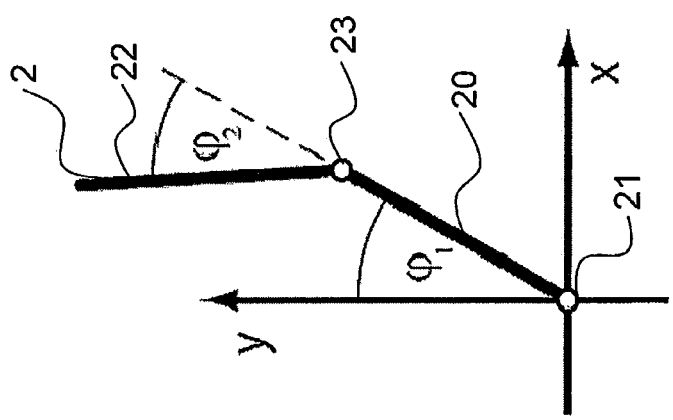
Figure 4C:
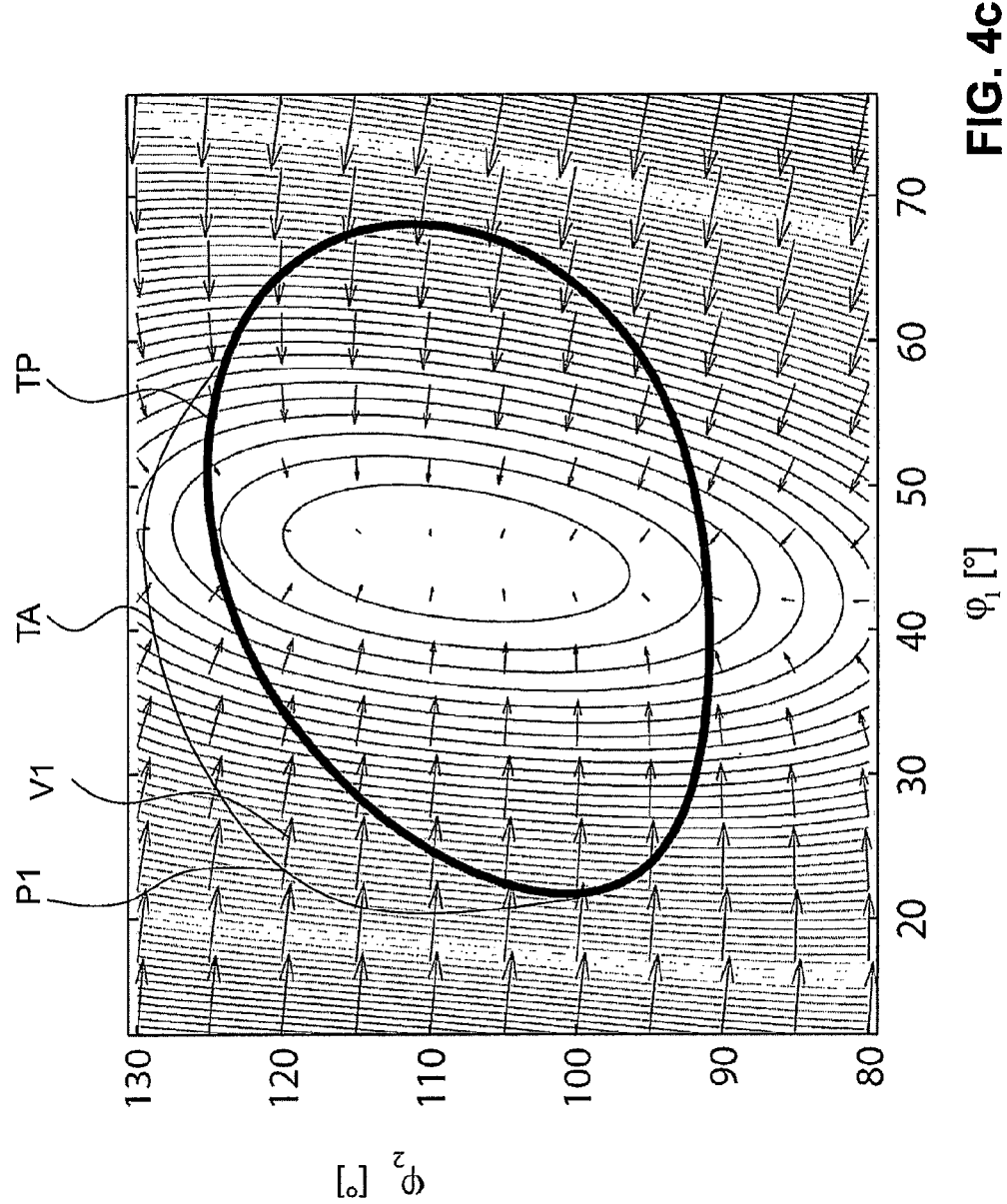
FIG. 4c show a predefined trajectory of the motion of the manipulator of FIGS. 4a and 4b in joint coordinates with the corresponding optimized force field.

The second example is a robot in SCARA configuration, as displayed in FIGS. 4a and 4b. Said robot comprises a manipulator 2 having a first segment 20 which is connected to fixed point 21 in the operating space such that the first segment 20 is rotatable around said point in at least two dimensions. The manipulator comprises further a second segment 22 which is connected to the first segment 20 via a joint 23. The mass, inertia, and damping of the robot are given.

The robot with the two segments 20, 22 is supposed to be moved along an elliptic predefined trajectory TP or path in the x/y-plane by the operator which is not shown. It does not matter where the operator guides the robot, for example he could interact with the robot only at the outermost point, the endeffector, or the operator could act onto one or more of the segments 20, 22. Both segments 20 and 22 have rotational inertia and mass, but there is no gravity acting in the plane. The predefined trajectory TP has the form of an ellipse. The equations used to, generate this exemplary trajectory and its derivatives are:

$$x=a\cos(\omega t), \dot{x}=-a\omega\sin(\omega t), \ddot{x}=-a\omega^2\cos(\omega t)$$

$$y=c+b\sin(\omega t), \dot{y}=b\omega\cos(\omega t), \ddot{y}=-b\omega^2\sin(\omega t), \quad (8)$$

with a=0.2, b=0.1, offset c=0.5, and frequency $\omega=4\pi$ rad/s. The time vector t runs from 0 to 0.5 seconds. This means that the operator completes the ellipse within 0.5 seconds.

The robot's equations of motion of formula (2), as well as the predefined trajectory in Cartesian coordinates is now used to find an optimal force field. First, a suitable parameterization is required, and here it is done in terms of the potential. It does not matter in which space the potential is defined, whether in joint or in Cartesian space. Here, the potential is defined as a function of the angles $\phi_1$ and $\phi_2$. As an exemplary, frequently used parameterization, Radial Basis Functions (RBFs) are employed here. To keep it simple, an exponential form is used, and the basis functions are not normalized. The potential is then defined in terms of several centerpoints $c_i$ and weighting parameters $w_i$:

$$\phi = \sum_{i=1}^{N} w_i e^{-r_i^2}. \quad (9)$$

The radius $r_i$ is the Euclidean distance between a point $q=[\phi_1,\phi_2]^T$ in the $\phi_1/\phi_2$-plane and the i-th centerpoint $c_i=[c_{i1}, c_{i2}]^T$. For the k-th sample and the i-th centerpoint, the radius $r_{ik}$ is defined to be:

$$r_{ik}=|q_k-c_i|=\sqrt{(\phi_{1k}-c_{i1})^2+(\phi_{2k}-c_{i2})^2}. \quad (10)$$

The choice of the N centerpoints is free, for example they can be placed on the nodes of a grid, or they can be points on the path, i.e. on the trajectory to be followed (in this case the ellipse). Both approaches lead to a very similar result in this example.

The force vector $\tau_{elast}$ now contains the joint torques $\tau_1$ and $\tau_2$ corresponding to the first and second joint of the robot, and it can be calculated as the negative gradient of the potential:

$$\tau_{elast} = -\nabla_q \phi = -\sum_{i=1}^{N} -2r_i w_i e^{-r_i^2} \begin{pmatrix} \frac{\partial r_i}{\partial \varphi_1} \\ \frac{\partial r_i}{\partial \varphi_2} \end{pmatrix} \quad (11)$$

After differentiation of (10) and some simplifications, the result is $$\tau_{elast} = 2 \sum_{i=1}^{N} w_i e^{-r_i^2} (q - c_i). \quad (12)$$

As it is linear in the parameters $w_i$ we can rewrite this equation in matrix notation. Using the matrix $A_k$ for the k-th data point with $$A_k = 2(e^{-r1k^2}(q_k-c_1) \; e^{-r2k^2}(q_k-c_2) \ldots e^{-rNk^2}(q_k-c_N)) \quad (13)$$

and the vector of weights $$w = (w_1 \; w_2 \ldots w_N)^T, \quad (14)$$

we obtain $$\tau_{elast}(q_k) = A_k w. \quad (15)$$

When the matrices $A_k$, with k=1 . . . n, are concatenated for all samples to a matrix A, the explicit cost function of (7) is:

$$J = \left\| \begin{pmatrix} \tau_{needed,1} \\ \cdots \\ \tau_{needed,k} \\ \cdots \\ \tau_{needed,n} \end{pmatrix} - \begin{pmatrix} A_1 \\ \cdots \\ A_k \\ \cdots \\ A_n \end{pmatrix} w \right\|_Q^2 \quad (16)$$

This is a simple linear Least Squares (LS) problem and the parameter vector w can be found by use of the pseudoinverse, or by using recursive LS.

An important fact is that the equation system does not have sufficient rank, because there are only conditions for the gradient, and not for the absolute potential. Therefore, an additional equation is necessary to avoid numerical problems. This can e.g. be the equation that $$\sum_{i=1}^{N} w_i \stackrel{!}{=} N, \quad (17)$$

which simply means one additional row in A containing only elements of value 1, and one additional row in $\tau_{needed}$ with entry N before solving the optimisation problem.

Figure 4D:
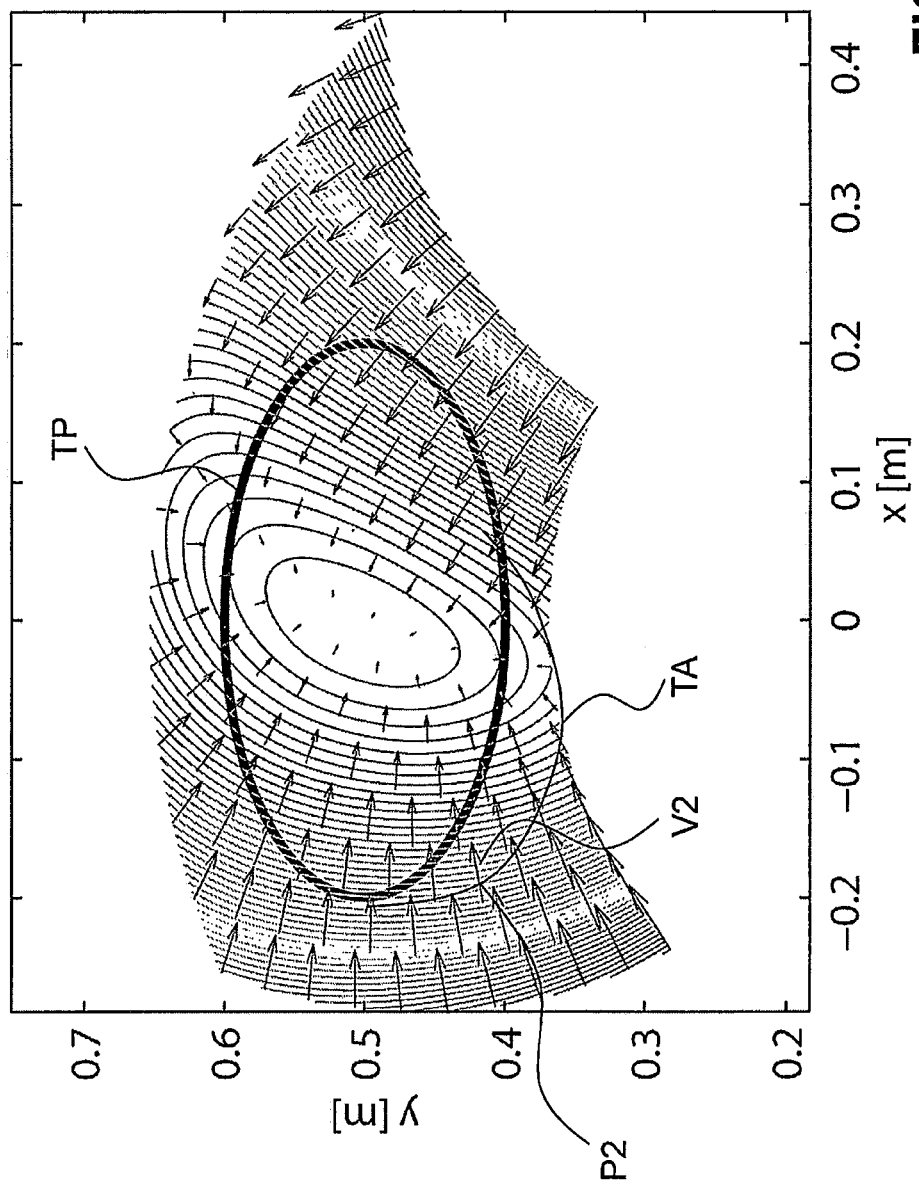
FIG. 4d show a predefined trajectory of the motion of the manipulator of FIGS. 4a and 4b in Cartesian coordinates with the corresponding optimized force field.

For the example that the trajectory is an ellipse in Cartesian space, the optimized force field is displayed in FIGS. 4c and 4d both in joint coordinates (FIG. 4c) and in Cartesian coordinates (FIG. 4d).

The Coefficient of Determination of the fitted force field in this example can reach 100% (96 and 98 for joints 21 and 22, respectively, if the weights $w_i$ are penalized to avoid too high potentials at the workspace limits), meaning that the robot can be moved with almost no effort, and the desired trajectory becomes its natural oscillation. It can be seen that whenever a turn is performed, the force field helps the operator in moving the robot, because it brakes the robot when approaching the turning point, and it helps to accelerate again once the point has been passed. This way, the robot dynamics are compensated.

As mentioned above, the conservative force field that is placed within the conservative force field module comprises a plurality of points, such as P1 or P2, to which a compensation force vector V1 or V2 is allocated. The operator follows the actual trajectory TA which is here partly not equal to the predefined trajectory. If the manipulator passes P1 a compensation force having the vector V1 will be applied via the actuator onto the manipulator. The compensation force thereby provides that the operator experiences a certain relief in terms of effort when the actual trajectory TA (meaning his movement) is similar to the predefined trajectory TP.

Figure 4F:
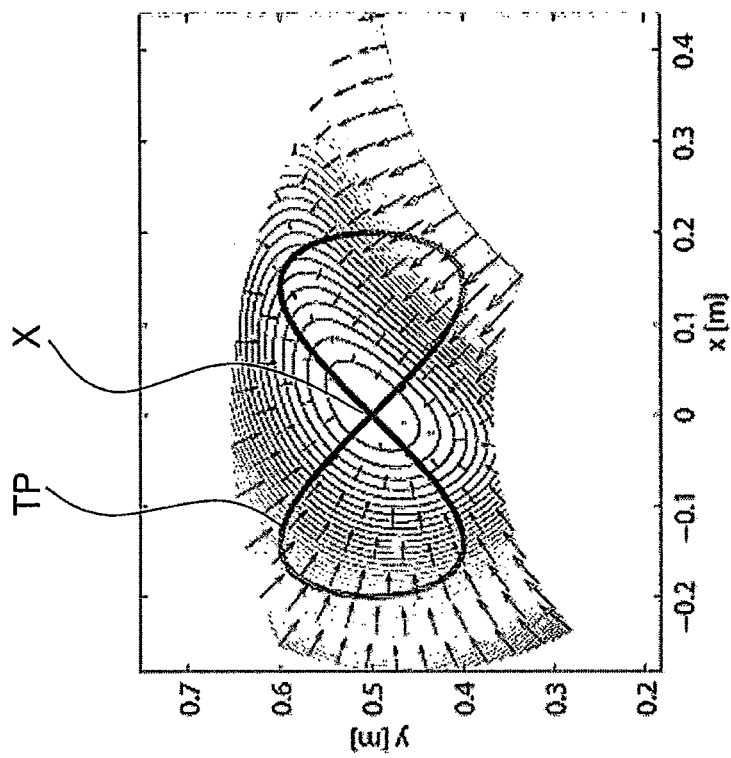
FIG. 4e to 4h show a different predefined trajectory of the motion of the manipulator of FIGS. 4a and 4b in joint coordinates and in Cartesian coordinates with the corresponding optimized force field.
Figure 4E:
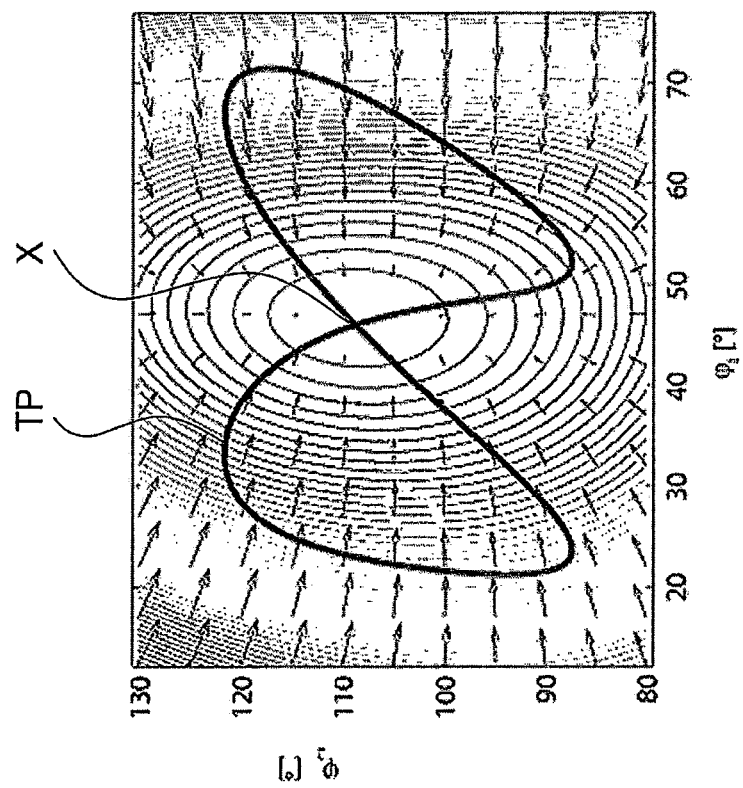
Figure 4H:
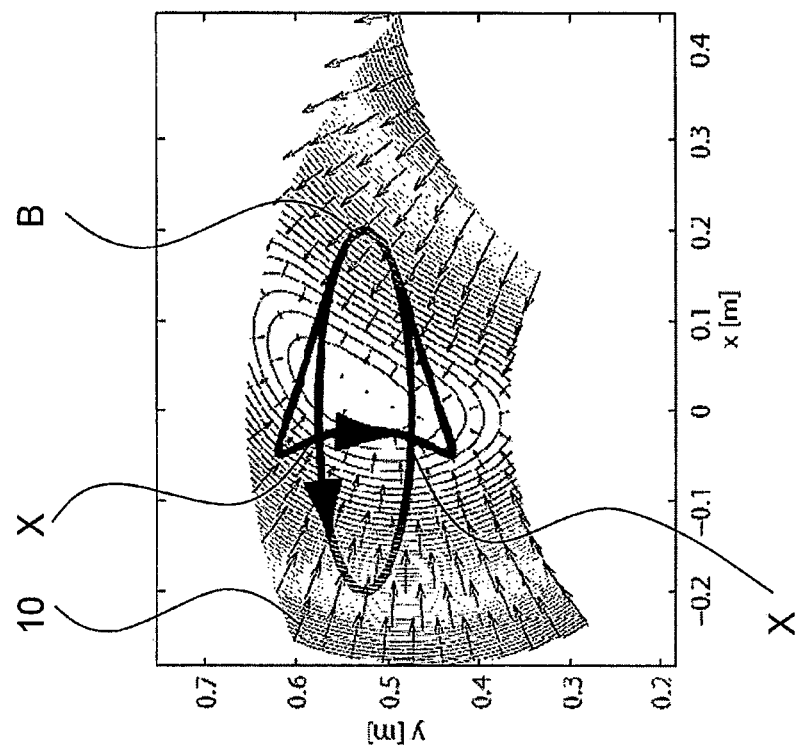
Figure 4G:
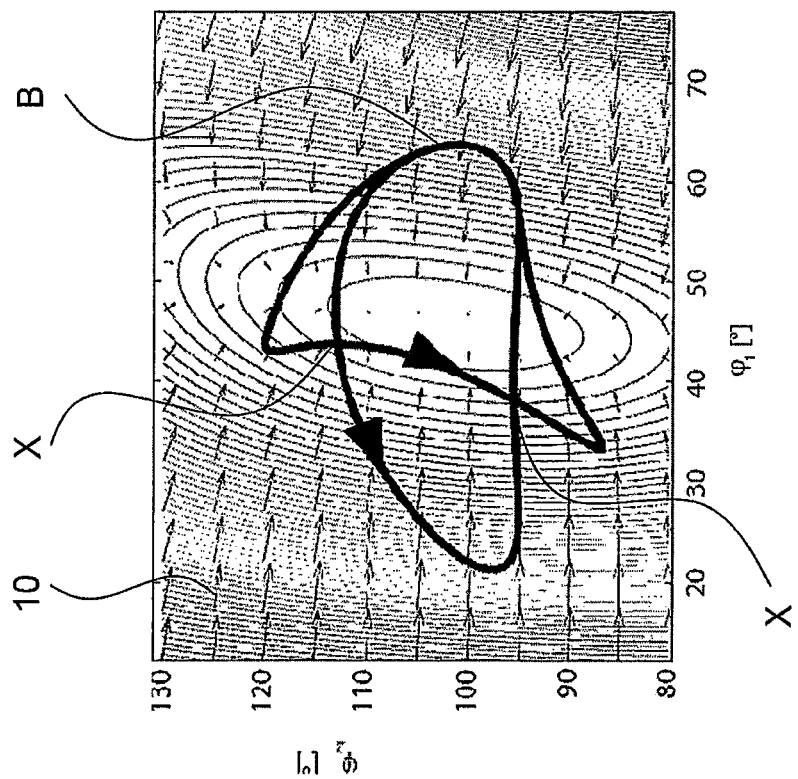

FIGS. 4e and 4f and FIGS. 4g and 4h show a further possible predefined trajectory and its force field in joint coordinates (FIGS. 4e/4g) and in Cartesian coordinates (FIGS. 4f/4h). The predefined trajectory as shown in FIGS. 4g and 4h has a bifurcation B and two crossing points X. For the following it is assumed that the operator preferably moves quickly along this trajectory with for example 0.5 seconds for each of the two closed paths. As the position, velocity and acceleration are identical in the bifurcation B, the needed torques are also identical in this point, and there is no compromise necessary, because the point is not overdetermined. In the crossing, however, different needed torques are necessary to follow each of the two paths, such that a compromise is necessary, and the elastic torques cannot compensate robot dynamics for both paths ideally.

Again, the conservative force field is calculated, but this time, only a little more than 80% compensation of needed torques is achieved. This example shows what can happen if various instances in the predefined set of dynamic trajectories "compete" for the optimal force in a given point (here in the X). Then, a compromise needs to be found to achieve minimum forces for both instances. However, the robot transparency is still considerably improved by the elasticities. In particular, it can be seen that each sharp turn in the trajectory is accompanied by forces in the field that help in braking and re-accelerating the robot.

It has to be noted that bifurcations B and crossing points X are considered as being different elements in view of the present invention. When passing a bifurcation, q and its first derivative (velocity) and second derivative (acceleration) are equal for both trajectory branches. When passing the crossing X, the manipulator has a different velocity and/or acceleration for each branch which means that only the path q is equal. The predefined trajectory TP is defined in terms of positions, velocities, and accelerations, and the force field is optimal if this trajectory is followed.

EXAMPLE 3

Superposition of Passive Components for a Lower-Extremity Exoskeleton

FIG. 5 shows a further example of a possible parameterization of a force field.

This third example illustrates that the concept can also be applied to non-stationary robots, and it shows how a parameterization could be done not in terms of the potential as in the preceding example, but directly in terms of the force field.

Figure 5A:
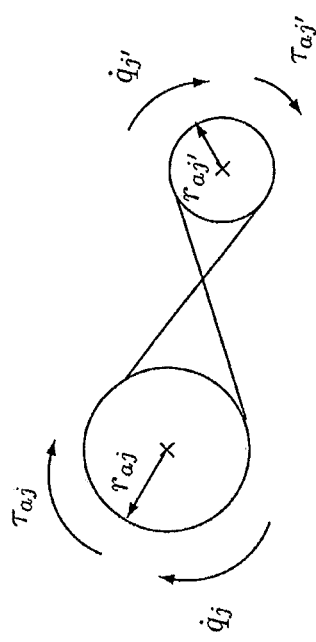
FIG. 5a to 5d Exemplary elasticities spanning a pair of joints.

1) Parameterization of the Force Field:

To give an example how to parameterize the conservative force field directly in terms of $\tau_{elast}(q)$, a superposition of passive components is used, which are linear in their parameters and motivated by the idea of rubber belts spanning two joints as illustrated in FIG. 5a.

The deformation of the a-th elasticity spanning joints j and j' with the levers $r_{aj}$ and $r_{aj'}$ is defined as the weighted sum of the joint angles:

$$s_a := r_{aj} q_j + r_{aj'} q_{j'} \tag{18}$$

If the elasticity produces a force in reaction to the deformation according to functions $g_{ai}(s_a)$ and corresponding parameters $p_{ai}$ with $$f_a(s_a) = \sum_{i=0}^{v} p_{ai} g_{ai}(s_a), \tag{19}$$

the torques on the two joints are $$\tau_{aj} = -r_{aj} f_a(s_a)$$

$$\tau_{aj'} = -r_{aj'} f_a(s_a). \tag{20}$$

The idea of a "rubber belt" is just a help to visualize the elasticity, because, as opposed to rubber, the resulting force can be an arbitrary function of the deformation s, it does not necessarily increase or decrease monotonously. Furthermore, the joints need not be rotational. The lever $r_{aj'}$ can be positive (see FIG. 5b), it can be negative, such that s is a weighted difference of joint positions/angles (see FIG. 5c), or it can be zero, such that s is proportional to the absolute value of $q_j$ with respect to an inertial frame (see FIG. 5d).

This last case describes a single-joint elasticity, where no energy is transferred from one joint to another.

Figure 5D:
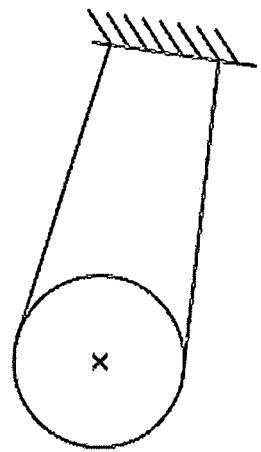
Figure 5C:
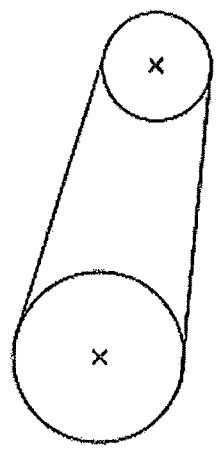
Figure 5B:
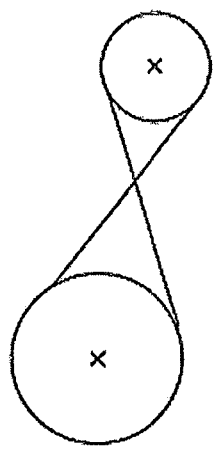

In summary, possible structures of the elasticity depending on the lever $r_{aj'}$ would be: The belt can couple the joints depending on the weighted sum (FIG. 5b) or difference (FIG. 5c) of joint angles, or it can produce a single joint elasticity (FIG. 5d).

A force field designed by superposition of various of these "elastic belts" is intrinsically conservative, no work is performed along any closed path.

Proof: If a potential $\phi_a(q)$ of the a-th elasticity exists, according to (5) it must fulfil the conditions:

$$\frac{\partial \phi_a}{\partial q_j} = -\tau_{aj} = r_{aj} f_a(s_a) \tag{21}$$

$$\frac{\partial \phi_a}{\partial q_{j'}} = -\tau_{aj'} = r_{aj'} f_a(s_a),$$

with $s_a$ defined in (18). Because $$\frac{\partial s_a}{\partial q_j} = r_j, \quad \frac{\partial s_a}{\partial q_{j'}} = r_{j'}, \tag{22}$$

such potentials exist, they are given by $$\phi_a(q) = \int f_a(s_a) ds_a. \tag{23}$$

As a sum of conservative force fields is again conservative, the superposition of elasticities described a conservative force field.

A number l of such elasticities is now designed by choosing various joint pairs j and j' and levers $r_{aj}$ and $r_{aj'}$, which defines the structure of the force field (There can be several elasticities spanning the same pair of joints, but with different levers). Then, the parameters $p_{ai}$ need to be optimized. To allow this, the problem is written in matrix notation. With the definition of $$g_a^T := (g_{a0}(s_a) \ldots g_{av}(s_a)) \tag{24}$$

and subsuming the parameters for the a-th elasticity in $$p_a := (p_{a0} \ldots p_{av})^T, \tag{25}$$

a matrix $R_a$ can be defined for the a-th elasticity, which contains nonzero entries only in rows j and j':

$$R_a := \begin{pmatrix} 0 \\ -r_{aj} g_a^T \\ 0 \\ -r_{aj'} g_a^T \\ 0 \end{pmatrix} \begin{matrix} \\ \leftarrow \text{row } j \\ \\ \leftarrow \text{row } j' \\ \end{matrix} \tag{26}$$

Now, an overall matrix R(q) can be defined for all/elasticities as $$R(q) := (R_1(q) \ldots R_a(q) \ldots R_l(q)), \tag{27}$$

just like an overall parameter vector p with $$p := (p_1^T \ldots p_a^T \ldots p_l^T)^T, \tag{28}$$

such that the torque vector $\tau_{elast}(q)$, generated by all elasticities for one specific position q, is described by $$\tau_{elast}(q) = R(q) p. \tag{29}$$

When the matrices $R(q_k)$ for all samples k with k=1 ... n, are concatenated to the matrix A, and the vectors $\tau_{needed,k} = \tau_{needed}(q_k, \dot{q}_k, \ddot{q}_k)$ are concatenated to a vector b for all samples, the explicit cost function of (7) is:

$$J = \left\| \begin{pmatrix} \tau_{needed,1} \\ \ldots \\ \tau_{needed,k} \\ \ldots \\ \tau_{needed,n} \end{pmatrix} - \begin{pmatrix} R(q_1) \\ \ldots \\ R(q_k) \\ \ldots \\ R(q_n) \end{pmatrix} p \right\|_Q^2 = \|b - Ap\|_Q^2 \tag{30}$$

This is a simple linear Least Squares (LS) problem and the parameter vector p can be found by use of the pseudoinverse, or by using recursive LS.

An important fact is that the matrix A might have deficient rank, because there is a redundancy in the parameters. This problem can be avoided by constraints, for example by setting selected parameters $p_i$ to zero. If the number of parameters is not too high, the issue can also be solved by including sufficient additional rows in A, b and Q; for example positive diagonal matrices could be concatenated to A and to Q, and a zero vector to b, in order to penalize high values of the parameters $p_i$.

Figure 6:
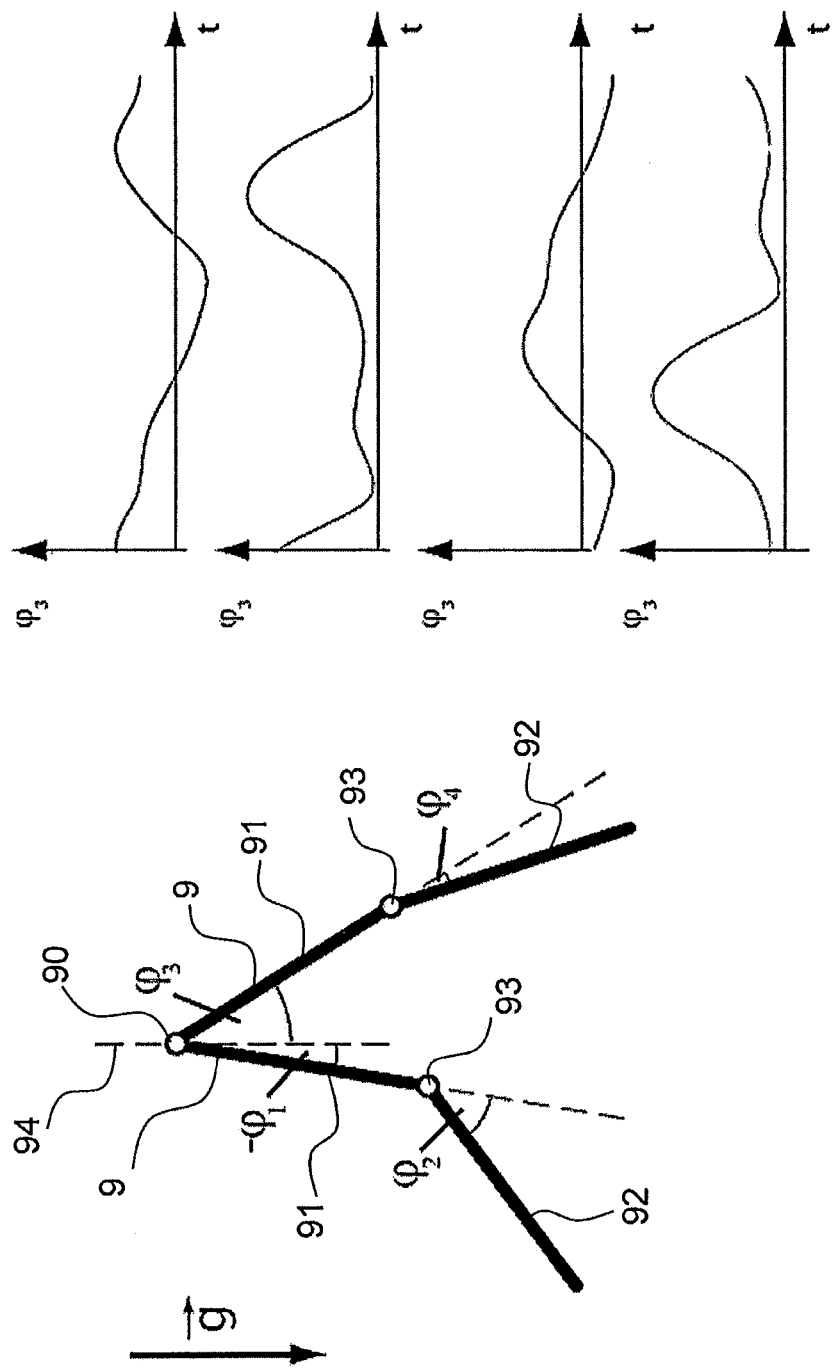
FIG. 6 an application of the technical teaching in connection with a gait robot.

One possible application on the technical teaching as described herein can be for gait robots. One example of which is shown in FIG. 6 showing a gait robot to the right and graphs showing the change of angle $\phi_3$.

In the present embodiment, the gait robot comprises two manipulators 9, to each of which a human leg, namely a left leg and a right leg is attachable. Each of the manipulators is connected fixed in terms of vertical and horizontal movements to a respective joint 90. Said joint 90 allows a rotational movement around itself, e.g. a pendular movement. Joint 90 could be fixed to an inertial frame, or it could be moved in space. Each of the manipulators comprises an upper segment 91, which is in connection with the joint 90, and a lower segment 92, which is connected to the upper segment 91 via a further joint 93. The angle between the upper segment 91 and the vertical 94 is defined by the variable $\phi_1$ or $\phi_3$ respectively. The angle between a prolongation of the upper segment 91 and the second segment 92 is $\phi_2$, for the one and $\phi_4$ for the other lower segment. Joint 90 can be a ball joint.

The operator is then connected with the thighs to the upper segment 91 and with the lower leg to the lower segment 92. Thereby the hip of the operator is approximately near the joint 90.

Such a gait robot may be a robotic exoskeleton with two actuated Degrees of Freedom per leg: Hip and knee flexion/extension in the sagittal plane. It can be a mobile device that is fixed to the human hip at joint 90 and carried by the human. Alternatively, joint 90 can be fixed to a stationary or mobile frame, in order to compensate the vertical forces generated by gravity. e.g. by a parallelogram structure with passive weight compensation. The robot is sketched as mentioned above in FIG. 6. For this example, we implemented the concept on the Lokomat gait rehabilitation robot. The robot disposes of force sensors between the actuators and the exoskeleton, such that reflected drive inertia can be reduced by force control. Using force control with the maximum possible gain, the reflected mass of the device at each joint is 0.3 kgm² for the knee, and 1.8 kgm² for the hip in the sagittal plane. This is about three times as much as the inertia of the human limbs around these joints, and it is caused mainly by stiff actuators with high transmission ratio. Especially this high inertia contributes to the high interaction torques during dynamic gait.

Generalized Elasticities or the conservative force field respectively, are now designed for this robot:

To simplify the problem, all functions $g_{ai}(s_a)$ in (16) are identical for all elasticities, and they are powers of s:

$$g_{ai}(s_a)=s_a^i, a=1,\ldots,l, i=1,\ldots,v. \qquad (31)$$

Here, the degree v of the polynomial is chosen as seven (Such that each elasticity has eight parameters). For each joint j of the robot's four actuated joints, one single-joint elasticity a and two coupling elasticities b and c are designed, using transmission ratios $r_j/r_j$ of 1 or −1. More specifically, $s_a=q_j$, $s_b=q_j+q_{j'}$, and $s_c=q_j-q_{j'}$. This leads to four single elasticities for each joint, and eight more elasticities spanning two joints: Right hip/left hip, right knee/right hip, left knee/left hip, right knee/left knee. Because the robot is symmetric, and the force field should also be symmetric, the parameters describing corresponding elasticities are constrained to be equal. This means that the matrices $R_a$ and $R_b$ according to (26) of two symmetric elasticities a and b can be merged into one matrix with four nonzero rows instead of two. This reduces the number of parameters from 12·8=96 to 8·8=64. The matrix A has deficient rank, and this is solved by concatenating a 64×64 diagonal matrix to penalize high coefficients. The matrix Q is diagonal, and weightings for knee torques are larger compared to the hip by a factor of $10^4$. This is done in accordance with subjective perception of subjects walking in the Lokomat, where knee interaction forces are perceived more grave than hip interaction forces. There is no additional weighting of specific instances in the gait cycle. The gait pattern used to calculate the elasticities is a typical physiological gait pattern, and velocities and accelerations are obtained using numerical differentiation.

The potential field cannot reduce the interaction torques to zero (the Coefficient of Determination reaches about 70-80% for the four joints), which means that the trajectories do not become the natural oscillation of the controlled system, and the operator still has to introduce some effort. This is due to the constraint of conservativeness and to the complexity of the trajectories.

In accordance with theoretical predictions, implementation and evaluation of the concept indeed showed significantly reduced interaction torques during walking in the robot.

For all the embodiments mentioned herein it is preferable that the conservative force field will be determined before each course of motion in order to include most of the parameters influencing the conservative force field.

The manipulator can be, but does not need to be fixed with regard to at least one degree of freedom. With regard to the above mentioned ball joint this means that said ball joint allows a movement of the manipulator in three degree of freedoms.

It has also be mentioned that forces relating to the conservative force field may not only be dependent on the dynamic model but also combined with other forces such as forces which support the operator in following a specified path.

| LIST OF REFERENCE NUMERALS | |
|---|---|
| 1 | robot device |
| 2 | manipulator |
| 3 | actuator |
| 4 | sensor arrangement |
| 5 | controller |
| 6 | conservative force field module |
| 7 | operator |
| 9 | gait robot |
| 10 | conservative force field |
| 20 | first segment |
| 21 | joint |
| 22 | second segment |
| 23 | joint |
| 90 | joint |
| 91 | upper segment |
| 92 | lower segment |
| 93 | joint |
| 94 | vertical |
| TA | actual trajectory |
| TP | predefined trajectory |
| OP | overdefined points |
| UA | underdefined areas |
| B | Bifurcation |
| X | crossing |
| DM | dynamic model |

The invention claimed is:

1. A method to control a robot device which comprises at least one manipulator which is moveable in an operating space, at least one actuator which actuates said manipulator, a sensor arrangement having at least one position sensor to determine an actual position of the manipulator and a controller which controls said actuator, the method comprising:
   moving said manipulator along an actual trajectory by means of an external force provided by an operator;
   providing compensation forces from the actuator onto the manipulator influencing torques or forces exchanged between the operator and manipulator;
   defining a conservative force field with a conservative force field module of the controller by the steps of:
   defining at least one predefined trajectory in the operating space;
   creating a force field based on positions of the manipulator in the operating space on said predefined trajectories and based on at least one of the group comprising the velocities of the predefined trajectories and the accelerations of the predefined trajectories; and calculating a conservative force field based on, said force field as a function of the position of the manipulator, wherein the conservative force field serves to determine control signals; and providing control signals from the controller for said actuator which provides said compensation forces based on the control signals, wherein the control signals are based on the conservative force field and on the actual position of the manipulator.

2. The method according to claim 1, wherein the conservative force field is further based on a calculation of needed torques as a function of and at least one of the group comprising the position, the velocities and the accelerations; and wherein an optimization of the compensation forces is conducted to determine the conservative force field as a function of the position, such that the difference between the compensation forces and the needed torques is as close as possible to desired interaction torques.

3. The method according to claim 1, wherein undefined areas in the operating space having undefined velocities and at least one of the group comprising undefined accelerations and undefined needed torques, will be filled by means of at least one of the group comprising interpolation fit and extrapolation fit under the criteria of the conservative force field.

4. The method according to claim 1, wherein overdefined areas in the operating space having overdefined velocities and at least one of the group comprising overdefined accelerations and overdefined needed torques, are included in the optimization, leading to at least one of the group comprising compromise behavior and average behavior, or leaving underdefined areas that can again be filled using at least one of the group comprising interpolation and extrapolation.

5. A robot device comprising:
at least one manipulator which is moveable in an operating space;
at least one actuator which actuates said manipulator;
a sensor arrangement having at least one position sensor to determine an actual position of the manipulator; and
a controller which controls said actuator;
wherein said manipulator is moveable along an actual trajectory by means of an external force provided by an operator;
wherein said actuator provides compensation forces onto the manipulator influencing the interaction torques or forces exchanged between operator and manipulator;
wherein the controller comprises a conservative force field module comprising a conservative force field which is defined by a method comprising the steps of defining at least one predefined trajectory in the operating space;
creating a force field based on positions of the manipulator in the operating space on said predefined trajectories and based on at least one of the group comprising the velocities of the predefined trajectories and the accelerations of the predefined trajectories; and
calculating the conservative force field based on said force field or forces, respectively as a function of the position of the manipulator, wherein the conservative force field serves to determine control signals allowing compensation of robot dynamics and other additional functions, such as assistance;

wherein the controller provides said control signals for said actuator, which provides said compensation force based on the control signals, wherein the control signals are based on the conservative force field and on the actual position of the manipulator.

6. The robot device according to claim 5, wherein the conservative force field module is a static function of position, which can be encoded in a look-up table comprising at least one of the group of corresponding position data and corresponding force data or in an arithmetic function.

7. The robot device according to claim 5, wherein the predefined trajectory is defined as at least one trajectory within the operating space of the manipulator and the predefined trajectory comprises crossing or bifurcations, wherein the operator chooses along which path it shall be followed.

8. The robot device according to claim 5, wherein the sensor arrangement comprises a force sensor.

9. The robot device according to claim 5, wherein the dynamics, including at least one of the group comprising an inertia of the manipulator and parts of an inertia of the operator, are compensated by means of the actuator.

10. The robot device according to claim 5, wherein the conservative force field is specifically determined for a specific trajectory of an operator and its requirements concerning compensation of dynamics of the manipulator.

11. The robot device according to claim 5, wherein the spatial dimension of the movement of the manipulator is limited by parameters.

12. The robot device according to claim 5, wherein the manipulator comprises at least one connection point to which the operator is connectable.

13. The robot device according to claim 5, wherein the manipulator is fixed with regard to at least one degree of freedom.

14. The robot device according to claim 5, wherein the compensation force provided by the actuator has a value which enables movement of the manipulator with aid of the operator.

15. The method according to claim 1, wherein overdefined areas in the operating space having overdefined velocities and at least one of the group comprising overdefined accelerations and overdefined needed torques, are included in the optimization, using at least one of the group comprising interpolation and extrapolation.

16. The robot device according to claim 5, wherein the predefined trajectory is defined as a single trajectory or as a plurality of different trajectories within the operating space of the manipulator or the predefined trajectory comprises crossing or bifurcations, wherein the operator chooses along which path it shall be followed.

* * * * *